United States Patent

[11] 3,543,661

[72] Inventor William J. Rosen
 Dorchester, Massachusetts
[21] Appl. No. 748,773
[22] Filed July 30, 1968
[45] Patented Dec. 1, 1970
[73] Assignee Polaroid Corporation
 Cambridge, Massachusetts
 a corporation of Massachusetts

[54] CAMERA ERECTING SYSTEM
 4 Claims, 3 Drawing Figs.
[52] U.S. Cl. .................................................. 95/11,
 95/39
[51] Int. Cl. .................................................. G03b 17/04
[50] Field of Search .......................................... 95/11, 13,
 39, 40,

[56] References Cited
 UNITED STATES PATENTS
 2,880,659 4/1959 Land ........................ 95/13
 3,447,437 6/1969 Tiffany .................... 95/13
 3,479,941 11/1969 Erlichman ................ 95/39

Primary Examiner—Norton Ansher
Assistant Examiner—Alan Mathews
Attorney—Brown and Mikulka and Alfred E. Corrigan ABSTRACT: A folding camera including components of the camera's exposure system pivotally coupled to each other and an erecting system for supporting the camera in an erect position. A first component includes means for supporting photosensitive material in position for exposure and a second component includes a reflector for reflecting light from a lens onto the photosensitive material. The erecting system provides a rigid means for supporting and maintaining the first and second components in a predetermined spacial relation when the components are in an erect position. The erecting system includes two links pivotally coupled to the camera housing and to each other by a lost-motion connection for allowing movement of one link relative to the other as the erecting system approaches a collapsed or folded position without imparting any movement to the other link. One link is provided with a projection which cooperates with an aperture in the other link to lock the erecting system for maintaining the camera in its extended or operative position.

3,543,661

Patented Dec. 1, 1970

INVENTOR.
William J. Rosen
BY Brown and Mikulka
and
Alfred E. Corrigan
ATTORNEYS

CAMERA ERECTING SYSTEM

This invention relates to an erecting system for a folding camera. Folding cameras of the type disclosed herein generally include a plurality of members pivotally coupled to each other for movement between a collapsed or folded position and an extended or operative position in which the members define an exposure chamber, the members being supported in the extended position by an erecting system. In the folded position the camera presents itself as a small, compact and easily handleable object which can be carried readily in a coat pocket or pocketbook. However, this compactness presents the problem of providing the erecting system with enough space in which to function without sacrificing the compactness of the camera. Accordingly, an object of the invention is to provide in a folding camera an erecting system the components of which are so coupled as to restrict their range of movement to a minimum thereby preserving the compactness of the camera in its folded or collapsed position.

Another object of the invention is to provide in a camera of the foregoing type including a first member having means for supporting photosensitive material in position for exposure and a second member including means for reflecting an image onto said photosensitive material, an erection system for coupling said members to each other to provide for a rigid means to support and maintain said members in a predetermined spacial relation when said members are in an extended position.

Another object of the invention is to provide in a camera of the foregoing type including an erecting system having a pair of pivotally coupled links for supporting members of the camera in an extended position, means associated with each of the links for preventing relative movement therebetween in the extended position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
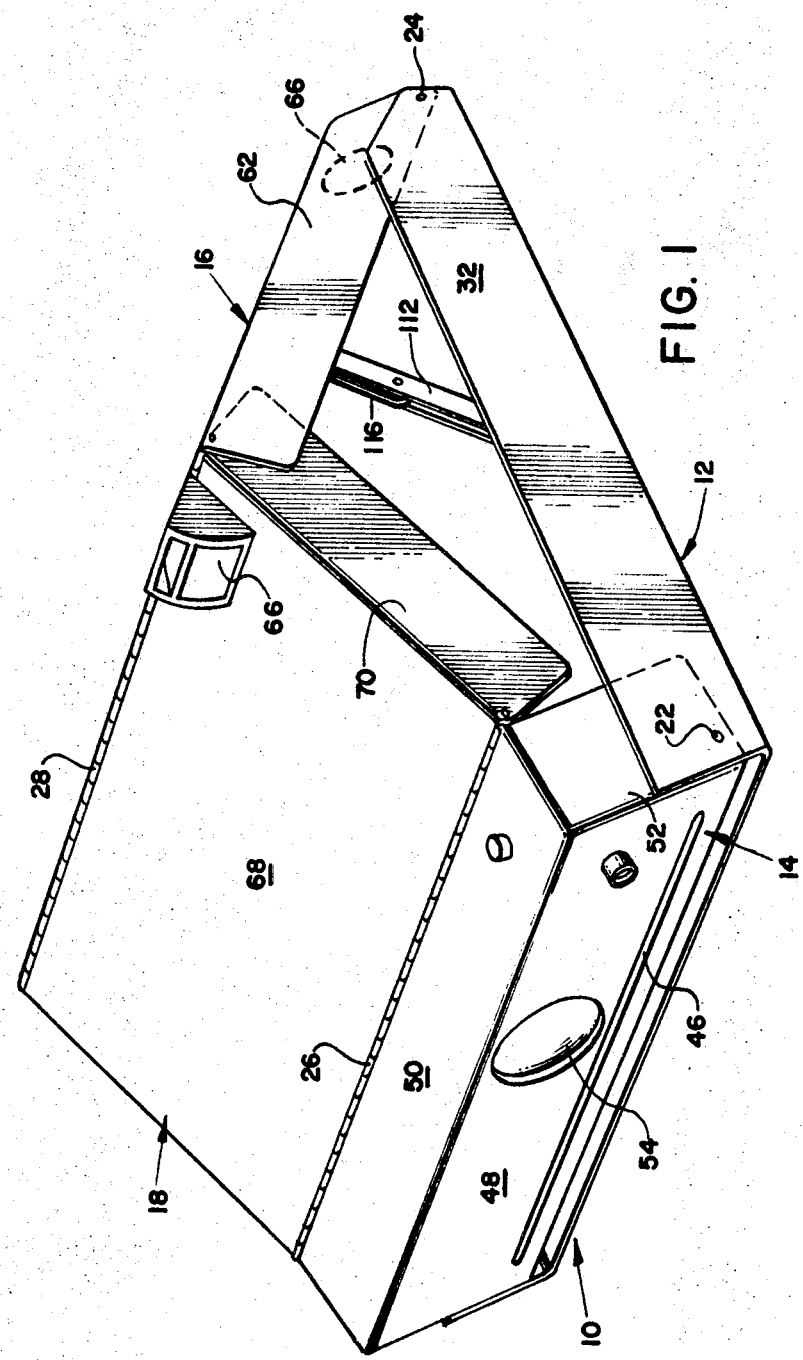
FIG. 1 is a perspective view of a camera embodying the invention shown in its extended or operative position.
Figure 2:
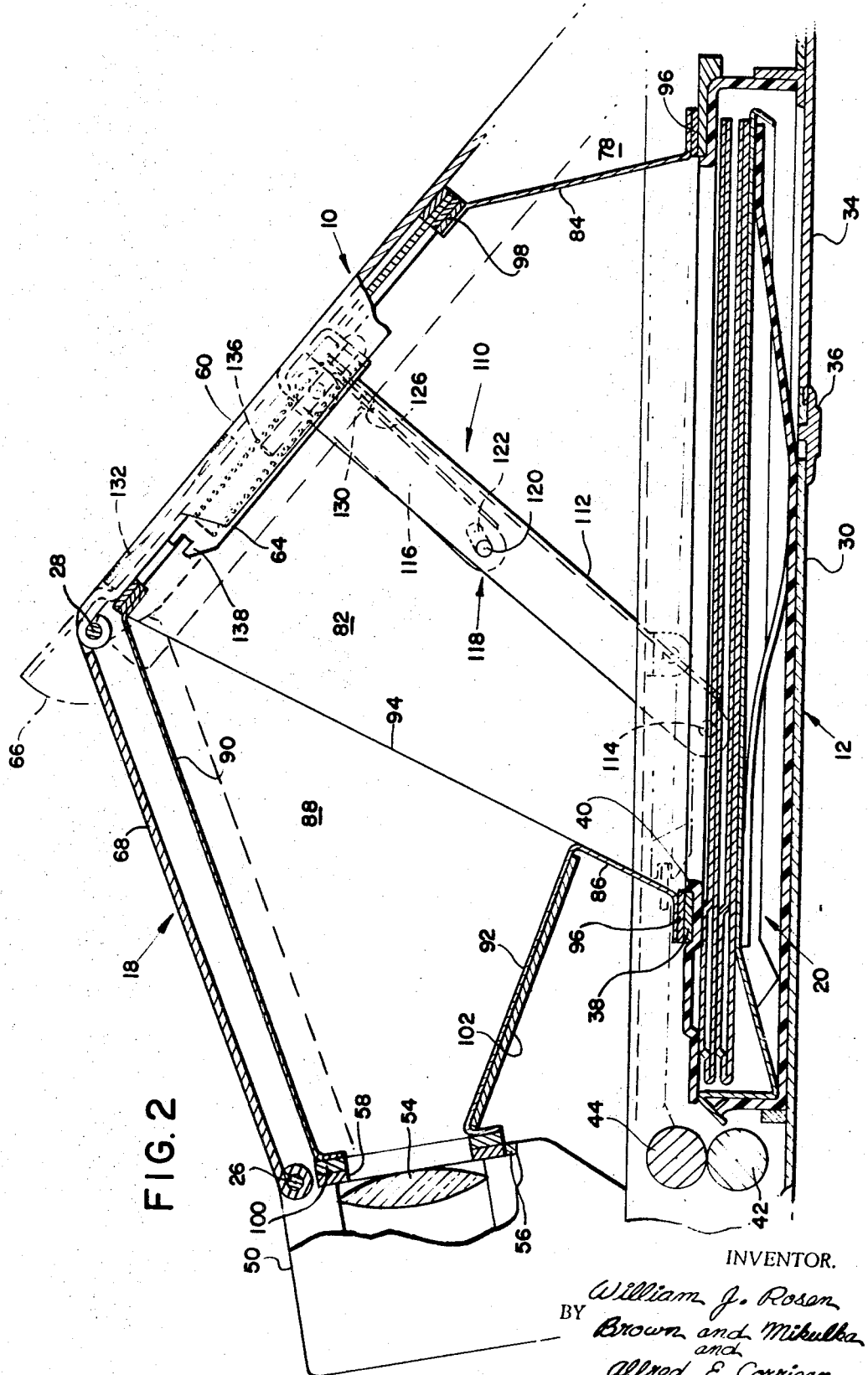
FIG. 2 is an elevation view partly in section of a camera incorporating an erecting system embodying the invention.

Reference is now made to FIGS. 1 and 2 of the drawings wherein there is shown a camera, generally designated 10, comprising a housing including a first or rear section 12, a second housing section 14, a third section 16, and a fourth section 18. The first housing section 12 may be characterized as the rear housing section and is adapted to hold a film pack 20 or assemblage of film units comprising a plurality of film units adapted to be exposed within the film pack and advanced through the camera. The first housing section is pivotally connected near one end to second housing section 14 at pivots 22 (only one of which is shown) and at its opposite end to third housing section 16 at a hinge 24. Housing sections 14 and 16 are coupled to fourth housing section 18 at, respectively, hinges 26 and 28 having axes arranged in generally parallel relation with the axis of pivots 22 and hinge 24. The housing sections cooperate to form, in effect, a four-bar linkage which is movable between an operative or extended position shown in FIGS. 1 and 2 in which the housing sections are spaced apart to provide four sides of an exposure chamber and a folded or collapsed position in which the first and second housing sections are located end to end substantially in a line and the third and fourth housing sections are located in line with one another and in face-to-face adjacency with the first and second housing sections.

First housing section 12 which comprises one component of the camera's exposure system in that it supports a film unit in position for exposure includes a generally rectangular rear wall 30, dependent sidewalls 32 and a door 34, pivoted about hinge 24, and adapted to be retained in a closed position by a latch 36 and to be opened to permit loading of a film pack 20 into the camera housing.

The camera is adapted to be employed with a film pack 20 of the type shown and described in greater detail in the copending U.S. Pat. application of Edwin H. Land, Ser. No. 655,850, filed July 25, 1967 and incorporating a plurality of film units of the type shown and described in the U.S. Pat. application of Edwin H. Land, Ser. No. 622,287 and Edwin H. Land et al. Ser. No. 622,286, both filed March 10, 1967. Film pack 20 includes a plurality of film units arranged in stacked relation with the film unit closest the forward wall of the pack located in position for exposure and each film unit is adapted, following exposure, to be withdrawn from the film pack and processed to form a visible image by a processing mechanism incorporated in the camera. To position the film pack and the film units therein for exposure, the first housing section includes an inner wall or focal plane plate 38 spaced from rear wall 30 in position to locate the forwardmost film unit for exposure and including a rectangular exposure aperture 40 through which light may be transmitted for exposing the forwardmost film unit in the film pack.

Since film pack 20 is tapered, as shown, toward its trailing end, inner wall 38 may be mounted for pivotal movement away from rear wall 30 in the manner described in the aforementioned Land U.S. Pat. application in order to facilitate loading of a film pack into the camera when door 34 is opened for this purpose.

The processing system of the camera includes a pair of pressure-applying rolls 42 and 44 mounted in juxtaposition near the leading end of the film pack and means, described in detail in the aforementioned U.S. Pat. application Ser. No. 655,850, for feeding the exposed film units into the bite of the rolls and rotating the rolls to distribute a processing liquid within the exposed film unit while advancing the latter from the film pack between the rolls and from the camera. Rolls 42 and 44 may be mounted in either the first or second housing sections or, as shown in FIG. 2, roll 42 is mounted in both with the axis of pivots 22 being coincident with the axis of roll 42. An opening 46 is provided in the second housing section to permit advancement of a film unit, during processing, between rolls 42 and 44 from the camera housing.

Second housing section 14 is generally parallelepiped shaped, is engaged between sidewalls 32 of the first housing section and is pivotable with respect to the first housing section about the axis of roll 42. The second housing section includes outer wall 48 which, in the folded position of the camera housing, is located in essentially the same plane as rear wall 30, and in the extended or operative position of the camera housing, functions as the forward wall of the camera. Suitable openings are provided to admit light into the camera lens, and the second housing section includes an outer wall 50 which, in the folded position of the camera, constitutes an end wall of the camera and in the extended position of the camera functions as one of the upper walls of the camera housing; and sidewalls 52 are engaged between side walls 32 of the rear housing section. A conventional photographic objective lens designated 54 is mounted within the second housing section with the lens axis disposed perpendicularly to the outer or forward wall 48 such that light transmitted through the lens along the axis is directed, in the operative position of the camera housing, away from and at an acute angle with respect to the focal plane plate; and in the folded position of the camera housing, the axis of lens 54 extends approximately perpendicularly to the focal plane plate. The second housing section also includes an inner or rear wall 56 disposed in generally parallel relation with outer wall 48 and provided with an aperture 58 for transmitting light from lens 54.

Third housing section 16 which comprises another component of the exposure system includes an outer wall 60 pivotally connected at one end via hinge 24 to rear housing section 12, and dependent sidewalls 62 engaged between sidewalls 32 of the rear housing section. Wall 60 supports a substantially planar and preferably front surface mirror 64 on the inside of wall 60 for reflecting light from lens 54 toward a film unit positioned for exposure behind aperture 40 in focal plane plate 38. The angle at which the axis of lens 54 intersects mirror 64 in the operative position of the camera housing is preferably greater than 45° in order to provide for a more compact camera structure and mirror 64 is trapezoidal in shape with the end of the mirror closest hinge 28 and lens 54 being narrower than the opposite end of the mirror.

A conventional viewfinder, generally designated 66, may be mounted within third housing section adjacent one side of mirror 64 and includes entrance and exit apertures provided with mirrors at opposite ends of the third housing section.

Fourth housing section 18 comprises an outer wall 68 pivotally connected at one end at hinge 28 to outer wall 60 of third housing section 16 and along its opposite end at hinge 26 to the second housing section 14, and dependent sidewalls 70 engaged between sidewalls 62 of third housing section 16 and outside of the ends of second housing section 14 so that in the folded position of the camera housing, the third and fourth housing sections are located between sidewalls 32 of the first housing section and the sidewalls 52 of the fourth housing section are located between the sidewalls 70 of the third housing section 18.

The camera includes means for light sealing the camera housing to provide a lighttight optical path between the lens mirror and focal plane plate. These means comprise an envelope formed of a thin opaque elastomeric material such as rubber, neoprene, silicone rubber and the like. The envelope includes a main body section comprising sidewalls 82 and end walls 84 and 86 joined to one another to form a pyramid or tapered tube including openings at opposite ends; and an extended section including sidewalls 88, a forward wall 90, and a rear wall 92 joined to one another to form another tapered tube open at one end and joined at its other end to end wall 86 at an opening 94 therein. In the extended position, the envelope provides a chamber or container including a tapered main section open at opposite ends and a tapered secondary section joined to one side of the main section and open at its end. Rigid frames 96, 98, and 100 are provided at the openings in the envelope with walls 82, 84 and 86 being secured in a lighttight manner along their edges to frame 96 and along their opposite edges to frame 98, and walls 88, 90, and 92 being secured at their edges to frame 100. Frames 96 and 100 may be rectangular in shape with the opening in frame 96 corresponding in size and shape to exposure aperture 40 in focal plane plate 38 and the opening in frame 100 being sufficiently large so as not to vignette or block lens 54. Frame 98 is preferably trapezoidal in shape and includes an opening corresponding to mirror 64. Frames 96, 98, and 100 provide means for securing the envelope in a lighttight manner to, respectively, focal plane plate 38 around aperture 40, rear wall 60 around mirror 64 and inner wall 56 around aperture 58 to provide a lighttight chamber through which light may be transmitted from lens 54 to mirror 64 and thence through aperture 40 to an image-recording medium located behind the aperture.

The dimensions of the walls of the envelope are such that the walls are in a stressed condition and assume generally planar configurations when the camera housing is in an operative or extended condition; and most of the walls are in a substantially relaxed condition when the camera is in a folded condition. The flexibility, elasticity, and thickness of the material comprising the envelope permits the camera to be folded and unfolded repeatedly and requires very little space for the envelope when the camera is folded thereby further contributing to the compactness of the camera structure while insuring lighttightness where required. For a more detailed description of the envelope, reference is made to the copending U.S. Pat. application of Irving Erlichman, U.S. Ser. No. 663,719, filed Aug. 28, 1967.

Figure 3:
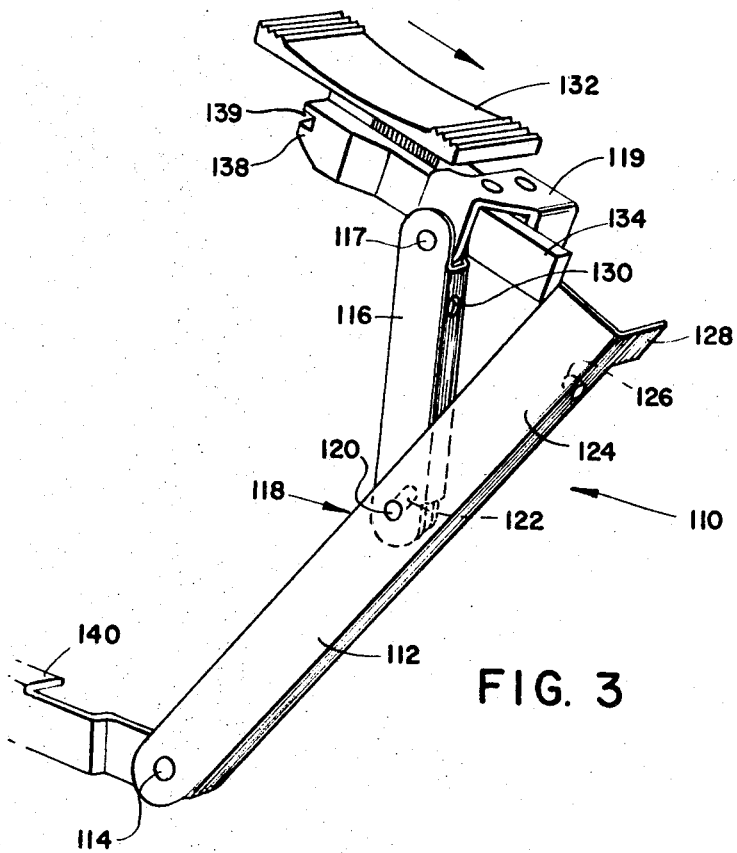
FIG. 3 is a perspective view of the erecting system as it appears when the camera is between the extended or operative position and a collapsed or folded position.

In accordance with the invention, the camera includes an erecting system for guiding the housing sections between an extended or operative position and a collapsed or folded position. The erecting system, generally designated 110, is comprised of a first link 112 pivotally coupled at 114 to one end of a latch plate 140 attached to housing section 12. A second smaller link 116 has one end thereof pivotally coupled at 117 to a bracket 119 attached to housing section 16 and its other end pivotally coupled at 118 to a portion of link 112 intermediate its ends. The coupling 118 comprises a lost-motion connection and includes a projection, e.g., pin 120, mounted on link 112 and an elongated slot 122 formed in link 116. As can be seen in FIG. 3, links 112, 116 are provided with a U-shaped configuration, as viewed in cross section, to provide for greater strength and for allowing link 116 to nest within link 112 when the links and camera housings are in the folded or extended positions The free end 124 of link 112 is provided with a projection 126 mounted between the legs of film U-shaped link 112 and with a tab 128. Projection 126 is adapted to enter aperture 130 located in link 116 to maintain the links 112, 116 rigidly coupled to each other when the camera is in the extended position shown in FIG. 1. In this latter position, i.e., the extended position links 112, 116 cooperate to form, in effect, a single rigid connection between sections 12 and 16. They also cooperate with sections 12 and 16 to define a triangular support structure thereby providing a rigid construction for maintaining a predetermined spacial relation between the mirror 64 and the film unit positioned for exposure in section 12 when the camera is in the extended position.

A release button 132, mounted on housing section 16, has an end portion 134 adapted to engage tab 128 when button 132 is moved to the right (as viewed in FIG. 3) for moving projection 126 out of aperture 130 to allow the erecting system to move to the collapsed position. Release button 132 is spring loaded to the left (as viewed in FIG. 2) by a spring 136. Button 132 has at its other end an inclined portion 138 which cooperates with latch plate 140 mounted on housing 12 to cam button 132 to the right until latch plate 140 can enter slot 139 to maintain the camera in the collapsed position.

In operation, when it is desired to collapse or fold the camera, release button 132 is moved to the right (as viewed in FIG. 3) to move end 134 into engagement with tab 128 to remove projection 126 from aperture 130. Once the projection 126 is removed from locking engagement with link 116, link 112 continues to rotate about pivot 114 in a clockwise manner while link 116 rotates about pin 120 in a counterclockwise manner. Links 112, 116 continue to rotate about their respective pivots until they approach a nearly horizontal position (as viewed in FIG. 3), i.e., parallel with wall 30. Due to the geometry of the camera, any further movement of link 116 toward the horizontal position would result in link 112 rotating to a position below the horizontal were it not for the elongation of slot 122. By elongating slot 122, link 116 can continue to rotate in a counterclockwise manner until link 112 assumes the horizontal position. At this time continued rotation of link 116 towards the horizontal position will cause slot 122 to move linearly as well as rotate about pin 120 without imparting any further movement to link 112. Thus, it should be readily apparent that by limiting the arc through which link 112 rotates, the compactness of the camera is maintained.

From the foregoing it can be seen that applicant has disclosed a simple and inexpensive erecting system for a folding camera wherein the range of movement of the components of the system is restricted thereby preserving the compactness of the camera in its folded condition.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A folding camera having an exposure system including first and second members pivotally coupled to each other for movement between a folded position and an extended position in which said first and second members define two sides of a triangle and occupy a predetermined spacial relation relative to each other, said first member including means for supporting photosensitive material in position for exposure and said second member including reflecting means for reflecting an image onto said photosensitive material positioned for exposure comprising, in combination:

erecting means including first and second links for retaining said first and second members in said folded and extended positions, said first link being pivotally coupled at one end thereof to one of said members, said second link being pivotally coupled at one end thereof to the other of said members;

lost-motion means coupling the other end of said second link to said first link intermediate the ends thereof to allow said second link to move relative to said first link as said first and second members approach said folded position without imparting motion to said first link; and detent means for releasably locking said first and second links for maintaining said first and second members in said extended position, said first and second links defining the third side of said triangle in said extended position.

2. A folding camera as defined in claim 1 wherein said detent means comprises means defining an aperture in one of said first and second links and a projection on the other of said links adapted to move into locking engagement with said aperture during movement of said first and second members into said extended position.

3. A folding camera as defined in claim 2 further including release means mounted on said one member for moving said projection out of said aperture and retainer means mounted on said other member adapted to engage said release means for releasably retaining said first and second members in said folded position.

4. A folding camera as defined in claim 3 wherein at least one of said first and second links has a U-shaped configuration in cross section for receiving the other link when said first and second members are in said folded position.